United States Patent [19]
Van Duijneveldt

[11] Patent Number: 5,971,567
[45] Date of Patent: Oct. 26, 1999

[54] BACKLIGHT LUMINAIRE

[75] Inventor: Wido Van Duijneveldt, Eindhoven, Netherlands

[73] Assignee: Flat Panel Display Co., B.V., Eindhoven, Netherlands

[21] Appl. No.: 08/916,777

[22] Filed: Aug. 20, 1997

[30] Foreign Application Priority Data

Sep. 18, 1996 [EP] European Pat. Off. .............. 96202610

[51] Int. Cl.⁶ ........................................................ F21V 7/00
[52] U.S. Cl. ........................... 362/296; 362/346; 362/347; 359/851
[58] Field of Search ............................. 359/851; 362/296, 362/297, 341, 346, 347

[56] References Cited

U.S. PATENT DOCUMENTS

| | | | |
|---|---|---|---|
| 4,562,517 | 12/1985 | Pankin | 362/147 |
| 5,143,433 | 9/1992 | Farrell | 362/29 |
| 5,555,162 | 9/1996 | Shemitz | 362/225 |

FOREIGN PATENT DOCUMENTS

2207496  2/1989  United Kingdom ............. B60Q 3/04

*Primary Examiner*—Cassandra Spyrou
*Assistant Examiner*—E. Cherry
*Attorney, Agent, or Firm*—F. Brice Faller

[57] ABSTRACT

A backlight luminaire (50) comprising a plurality of fluorescent lamps (44, 45) and a plurality of sub-reflectors (42, 43) is characterized in that the majority of the sub-reflectors (43) are provided with a portion of more than one lamp. In addition, the majority of the lamps (44, 45) are distributed over more than one sub-reflector (43). The lamps (44, 45) are preferably U-shaped and alternately connected in series. The backlight luminaire (50) is employed in liquid-crystal display devices (51) to attain a uniform light distribution.

18 Claims, 5 Drawing Sheets

BACKLIGHT LUMINAIRE

BACKGROUND OF THE INVENTION

The invention relates to a backlight luminaire for a display device, which luminaire comprises a plurality of fluorescent lamps and a reflector which includes a plurality of sub-reflectors.

The invention also relates to a liquid-crystal display device which includes a backlight luminaire.

Backlight luminaires are used as a light source in flat-panel type display devices, in particular liquid-crystal display devices (LCD devices).

Fluorescent lamps are very suitable for use as light sources in flat-type display devices because they have a high light output and the spectral characteristic of the light emitted can be adapted in a simple manner. In such display devices, a luminaire, which is arranged behind the display, is generally provided with elongated fluorescent lamps which are arranged in parallel relation to each other. It is alternatively possible to use U-shaped fluorescent lamps or so-called meander-shaped fluorescent lamps.

GB A2 207 496 discloses a backlight luminaire which is used as a light source for a liquid-crystal display (LCD) device, which luminaire includes a plurality of U-shaped fluorescent lamps which are alternately arranged at the back of a liquid-crystal display device. On the side of the backlight luminaire facing away from the liquid-crystal display device, there is provided a reflector including reflectors or an assembly of sub-reflectors. In general, the (sub-)reflectors are concave in shape. In the known backlight luminaire, one of the arm portions of one of the U-shaped fluorescent lamps is inserted between the arm portions of an adjacent lamp or lamps so as to be parallel thereto.

In general, it is desirable that the light source(s) in backlight luminaires should uniformly illuminate the active part of the display device.

A disadvantage of the known backlight luminaire is that if one of the (U-shaped) fluorescent lamps emits less light or light having a different spectral characteristic, or if one of said fluorescent lamps fails, there is a locally non-uniform light distribution at the location of the relevant lamp.

OBJECTS AND SUMMARY OF THE INVENTION

It is an object of the invention to provide a backlight luminaire in which the above-mentioned effects are reduced or obviated.

To this end, the backlight luminaire in accordance with the invention is characterized in that at least a number of the sub-reflectors are provided with a portion of at least two lamps, and at least a number of the lamps are situated in at least two sub-reflectors.

The inventor has recognized that by accommodating portions of the fluorescent lamps in two or more sub-reflectors and providing the sub-reflectors with a portion of at least two lamps, the adverse effect caused by the (temporary) reduction in light emission of one of the fluorescent lamps or by the fact that one of the lamps emits light having a different spectral characteristic (for example, if two lamps have a different color appearance), or by the fact that one of the lamps fails, is reduced by distributing (spreading) the change in light distribution over various sub-reflectors of the backlight luminaire. As a result of this spread, the non-uniformity of the light distribution is spread out (averaged out) over a relatively larger area of the backlight luminaire and becomes relatively less visible by virtue of the presence of (portions of) other lamps.

In the known luminaire, the effect of a deviation in a fluorescent lamp is limited to the sub-reflector accommodating the lamp, so that a non-uniformity of the backlight luminaire manifests itself more clearly.

An embodiment of the backlight luminaire in accordance with the invention is characterized in that the lamps comprise at least a first arm portion and a second arm portion, which arm portions are arranged in side-by-side relation to each other and are interconnected via a connecting portion, the first arm portion being accommodated in a first sub-reflector and the second arm portion being accommodated in a second sub-reflector.

By using lamps having arm portions which extend one beside the other (in general, the arm portions are at least substantially parallel to each other) and which are interconnected via a connecting portion, it is achieved that the first arm portion of one of the lamps is always provided in one of the sub-reflectors while the second arm portion of said lamp is provided in one of the other (adjacent) sub-reflectors. This results, in the case of sub-reflectors extending one beside the other, in a compact and efficient distribution of the fluorescent lamps in the backlight luminaire, so that the uniformity of the light output of the backlight luminaire is improved. A (fluorescent) lamp comprising two at least substantially parallel arm portions which are interconnected via a connecting portion, is referred to as a U-shaped or V-shaped lamp. A lamp comprising a plurality of arm portions extending one beside the other and being interconnected via a number of connecting portions, which connecting portions also extend parallel to each other, is referred to as a meander-shaped fluorescent lamp.

An embodiment of the backlight luminaire in accordance with the invention is characterized in that the above-mentioned portions exhibit, in the longitudinal direction, a variation of the spectral characteristic, and in that the spectral characteristic of the portion of a first lamp in a sub-reflector varies in the opposite direction relative to the variation in spectral characteristic of the portion of a second lamp in the sub-reflector.

The spectral characteristic, for example the color point, of fluorescent lamps is not uniform in the longitudinal direction of said lamps. A variation in the spectral characteristic of the lamp is generally caused by spreads occurring during the manufacture of fluorescent lamps, which variation occurs, for example, during filling the lamp with a phosphor mixture. As a result of mutually different physical properties, some components of the (three-) phosphor mixture adhere more rapidly to the lamp than other components. In general, the lamp is filled on one side from an end portion of the lamp, so that the spectral characteristic of the lamp changes in the longitudinal direction of the lamp, which results, for example, in a difference in color point over the length of the fluorescent lamp.

In accordance with the invention, the positioning of lamps in sub-reflectors must be taken to mean that (the portions of) the lamps are so positioned relative to each other in one sub-reflector that the spectral differences between the lamps are averaged out or leveled off. By orienting (portions of) the lamps in the above-described manner, spectral differences in one (portion of a) lamp are compensated for by arranging said (portion of) the lamp proximate to one (portion of a) lamp whose spectral characteristic varies in the opposite direction. In general, the (adjacent) (portions of the) lamps are so positioned relative to each other that the spectral characteristic of the sum of the (portions of the) lamps varies less than the spectral characteristic of the individual (portions of the) lamps.

An embodiment of the backlight luminaire in accordance with the invention is characterized in that all portions of the lamps are so arranged that the spectral characteristics of two portions extending side by side in one sub-reflector vary in opposite directions.

If the fluorescent lamps are elongated or U-shaped, and if an (arm) portion of a first lamp and an (arm) portion of a second lamp are arranged one beside the other in one sub-reflector, an effective compensation of an (at least substantially reproducible) variation in spectral characteristic in each one of said (arm) portions of the (at least two) lamps is attained by always alternately arranging the (arm) portions of the lamps having a defined variation in the sub-reflector in such a way that the spectral variation in the (arm) portion of the first lamp is compensated for by the spectral variation in the (arm) portion of the second lamp, which spectral variation changes in the opposite direction. In the adjacent sub-reflectors, corresponding (arm) portions of the (at least two) elongated or U-shaped lamps are accommodated in such a manner that also in these sub-reflectors the spectral variations of the (arm) portions of the lamps compensate each other; the (arm) portion of a lamp compensating for the spectral characteristic of the corresponding (arm) portion of the first or the second lamp may alternatively form part of a third lamp. By orienting all (portions of the) lamps in a backlight luminaire in accordance with the invention, variations in spectral characteristic of the light output of the luminaire are effectively reduced or obviated.

An embodiment of the backlight luminaire in accordance with the invention is characterized in that at least two of the lamps are connected in series.

As (alternating-current) power sources for fluorescent lamps do not have (exactly) the same output characteristic, two lamps connected to two different power sources may have a different light intensity (or luminance), which leads to a non-uniform light output of the active part of the display device. The effect of differences between two power sources is reduced and, hence, the uniformity of the light distribution of the backlight luminaire is further improved by connecting at least two lamps in series.

A preferred embodiment of the backlight luminaire in accordance with the invention is characterized in that the lamps are alternately connected in series.

In this Application, the expression "lamps which are alternately connected in series", is to be understood to mean that two (arm) portions of two lamps, which (arm) portions are arranged one beside the other in one sub-reflector, are not connected to the same power source. By alternately connecting the lamps in series, it is precluded that the effect of a power source having a slightly different voltage characteristic, which leads to variations in the light intensity (or luminance) of (at least) one of the (fluorescent) lamps, is distributed over two (arm) portions of the lamps arranged one beside the other in one sub-reflector. This can be brought about, for example, by groupwise (alternately) connecting the lamps in series or by alternately connecting all lamps in series. If two or more power sources are used and if the various power sources are suitably connected to the lamps, the effect of failure of one of the power sources on the light distribution can be minimized.

These and other aspects of the invention will be apparent from and elucidated with reference to the embodiments described hereinafter.

BRIEF DESCRIPTION OF THE DRAWINGS

The Figures are purely schematic and not drawn to scale. In particular for clarity, some dimensions are exaggerated strongly. In the Figures, like reference numerals refer to like parts, whenever possible.

DESCRIPTION OF THE PREFERRED EMBODIMENTS

Figure 1A:
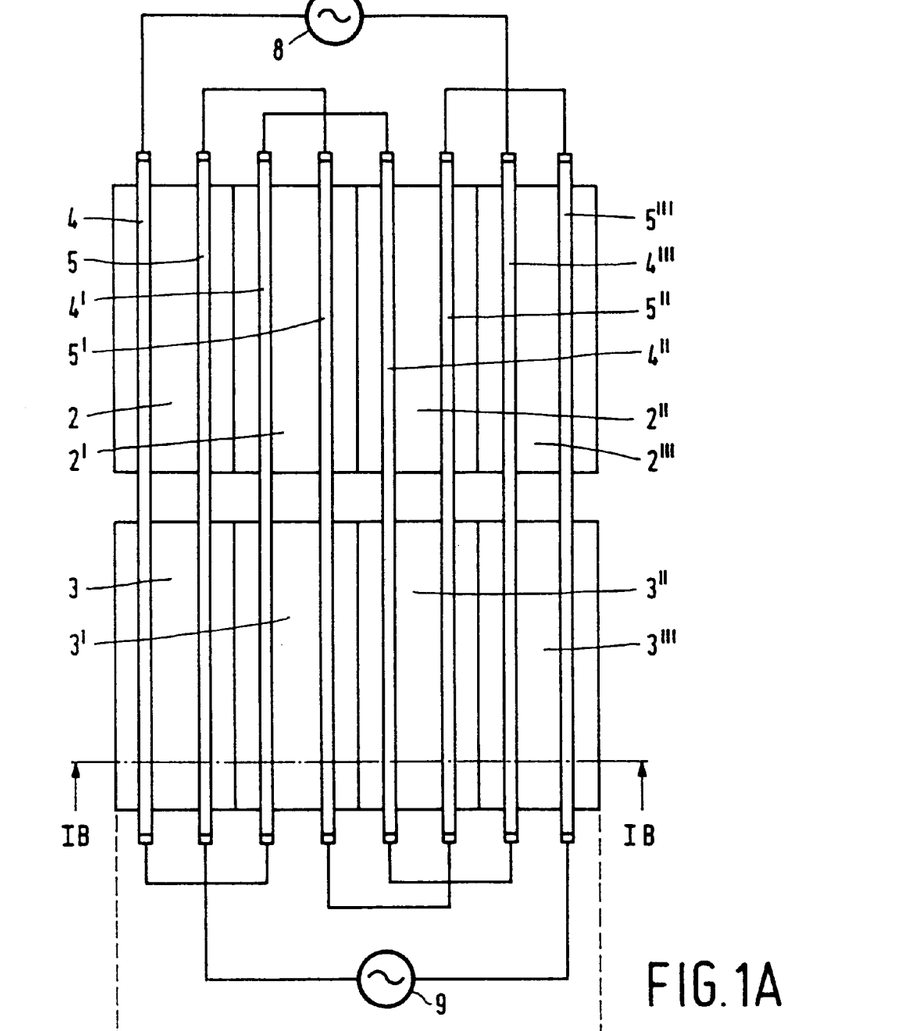
FIG. 1A is a plan view of an embodiment of the backlight luminaire in accordance with the invention, which is provided with fluorescent lamps.
Figure 1B:
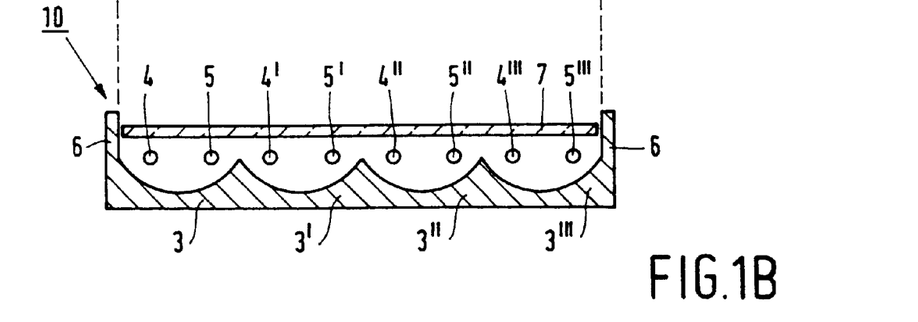
FIG. 1B is a cross-sectional view of the backlight luminaire, taken on the line IB—IB in FIG. 1A.

FIG. 1A is a schematic plan view of an embodiment of the backlight luminaire in accordance with the invention, which is provided with fluorescent lamps 4, 5, and FIG. 1B is a schematic, cross-sectional view of the backlight luminaire 10 as shown in FIG. 1A, which luminaire is further provided with a light-scattering cover 7 (diffusor) which is supported by walls 6. In the example shown in FIG. 1, the backlight luminaire 10 comprises a first group of sub-reflectors 2, 2', 2", 2"' and a second group of sub-reflectors 3, 3', 3", 3"', which groups of sub-reflectors 2, 3 are arranged in a side-by-side relation. Such a luminaire is used, for example, if the display device does not have to be illuminated integrally (for example if different types of information are displayed).

The (sub-)reflectors comprise directed reflectors which direct the direct and indirect light generated in the backlight luminaire towards the display device. In general, the reflectors are concave in shape and provided, for example, with a matt, white coating which brings about a (diffuse) reflection of the light emitted by the lamps in a direction away from the display device. The expression "concave (sub-)reflector" as used herein means that the lamps are accommodated in a chamber (the sub-reflector) comprising a rear wall facing the display device and (oblique) vertical side walls, or a rear wall and side walls which are completely or partly pit-shaped.

A first portion of the (linear) fluorescent lamps 4, 5 is always accommodated in the first group of sub-reflectors 2, and a second portion is always accommodated in the second group of sub-reflectors 3. In addition, each sub-reflector 2, 3 accommodates portions of two discrete fluorescent lamps 4, 5. By virtue of this way of distributing the lamps 4, 5 over the sub-reflectors 2, 3, differences in color point (spectral characteristic) and light intensity between (at least) two lamps are not limited to one sub-reflector, but distributed (spread out) over each sub-reflector accommodating at least one (equivalent) portion of each of these (at least) two lamps. By virtue thereof, the effect of a small deviation in a fluorescent lamp is averaged out in each sub-reflector, thereby substantially improving the uniformity of the back-light luminaire 10.

In addition, in the example shown in FIG. 1, the lamps 4, 5 are alternately connected in series in such a manner that (portions of) lamps 4, 5 in one sub-reflector are not connected to the same power source. In FIG. 1A two power sources 8, 9 (also referred to as inverters) are used, with one half 4 of the fluorescent lamps being connected in series to the first power source 8 and the other half 5 of the fluorescent lamps being connected in series to the second power source 9. As a result, if one of the lamps fails, the light of each sub-reflector will be reduced by fifty percent. The same effect occurs if one of the power sources is switched off or fails. As the lamps 4, 5 are distributed over the sub-reflectors 2, 3 in the manner described hereinabove, the quantity of light produced is halved in all (sub-)reflectors, so that the uniformity of the light output of the backlight luminaire is preserved, the only limitation being an integrally lower light intensity. By switching off one of the power sources, the integral light output of the backlight luminaire is halved without the uniformity of the light distribution being seriously affected, which switching option is desirable since the display device is employed in greatly varying ambient-light conditions (for example, if it is used as a backlight luminaire of display devices in vehicles or aircraft).

In an alternative embodiment of FIG. 1, the lamps can also be connected pairwise (and alternately) to a power source. In this case, four power sources are required. Moreover, if the lamps are connected to at least two groups of power sources, (the portions of) the lamps connected to one of the groups of power sources can be distributed over the sub-reflectors so that each of the sub-reflectors has a portion of a lamp of each of the groups. In this case, the backlight luminaire is preferably provided with a switch (not shown in FIG. 1) by means of which one of the groups can be switched off, so that, by switching off one of the (groups of) power sources, the integral light output of the backlight luminaire is reduced without the uniformity of the light distribution being seriously affected. Such switches or other types of light regulators (for example (electronic) light dimmers) constitute a very desirable means for regulating the light intensity of display devices, for example in the case of substantially varying ambient-light conditions.

Figure 2A:
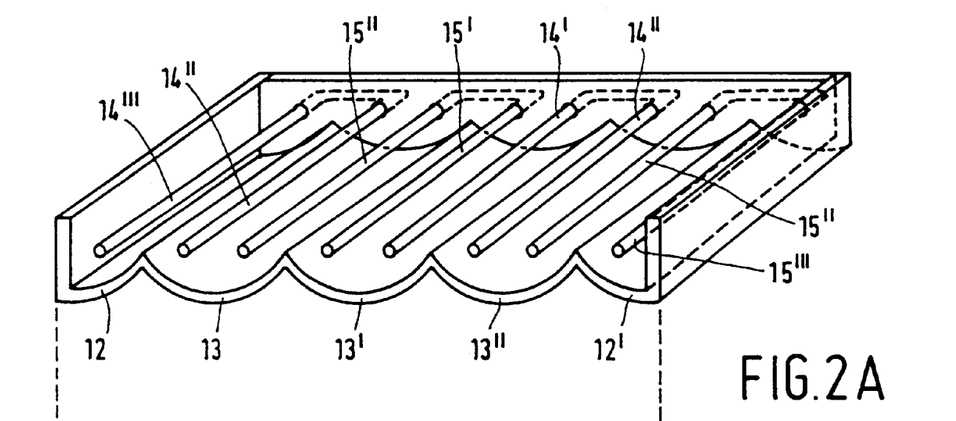
FIG. 2A is a perspective view of an embodiment of the backlight luminaire in accordance with the invention, which is provided with U-shaped fluorescent lamps.
Figure 2B:
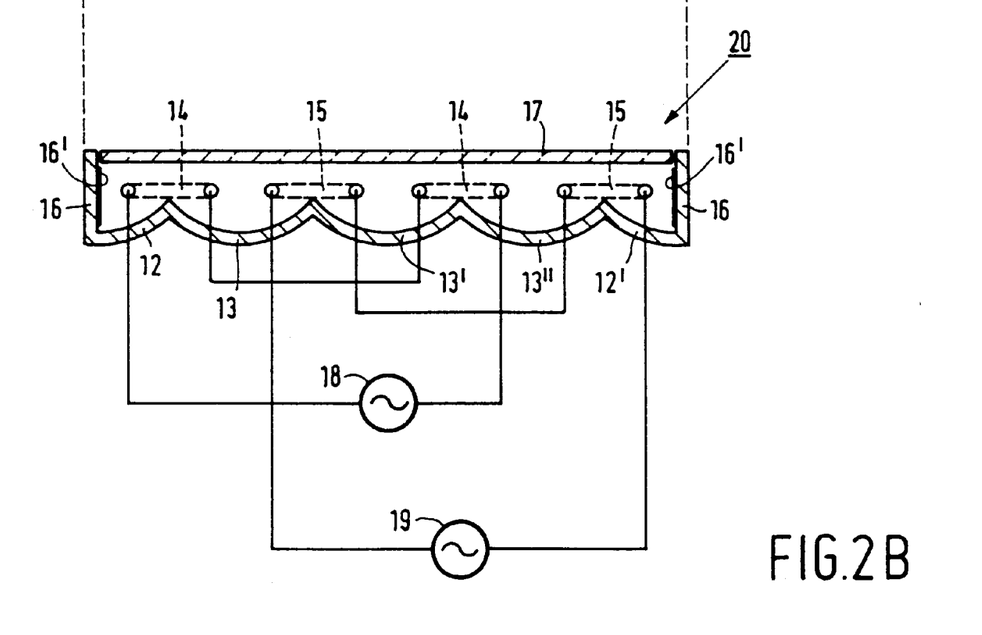
FIG. 2B is a cross-sectional view of the backlight luminaire shown in FIG. 2A.

FIG. 2A is a very schematic perspective view of an embodiment of the backlight luminaire in accordance with the invention, which is provided with U-shaped fluorescent lamps 14, 15, and FIG. 2B is a schematic, cross-sectional view of the backlight luminaire 20 shown in FIG. 2A, which luminaire is further provided with a light-scattering cover 17 which is supported by walls 16. In FIG. 2A, each arm portion of the U-shaped fluorescent lamps 14, 15 is indicated by a reference numeral, i.e. 14', 14" and 14''' and 15', 15" and 15''', respectively. In the example shown in FIG. 2, the majority of the sub-reflectors 13, 13', 13" always comprise two arm portions of two discrete U-shaped lamps, for example, arm portions 14' and 15' are situated in sub-reflector 13' and arm portions 14" and 15" are situated in sub-reflector 13 and in sub-reflector 13". In this example, two "half" sub-reflectors 12, 12', which each contain only one arm portion 14''', 15''' of a fluorescent lamp, are provided at the two edges of the backlight luminaire 20. The light output and the uniformity (homogeneity) of the light distribution are further improved if the (vertical) walls of the "half" sub-reflectors 12, 12' are provided with a reflective layer 16' having a high reflection coefficient. It is alternatively possible to avoid these "half" sub-reflectors in the backlight luminaire by arranging the sub-reflectors and the lamps in a different manner. In the example shown in FIG. 2A, the connecting portions of the U-shaped fluorescent lamps 14, 15, which connect the at least substantially parallel arm portions to each other, are situated on the outside of the backlight luminaire 20. In order to maximize the light output of the backlight luminaire, in an alternative embodiment, these connecting portions are incorporated in a transition portion between two sub-reflectors and hence are an integral part of the backlight luminaire.

The above-described method of distributing the lamps 14, 15 over the sub-reflectors 13, enables differences in color point (spectral characteristic) and light intensity between two lamps to be distributed (spread out) in each sub-reflector which accommodates an (equivalent) portion of each of the two lamps. This results in a substantial improvement of the uniformity of the backlight luminaire.

In addition, in the example shown in FIG. 2, the lamps 14, 15 are alternately connected in series in such a manner that (portions of) lamps 14, 15 in one sub-reflector 13 are not connected to the same power source. In FIG. 2B, two power sources 18, 19 are employed, with the two U-shaped lamps 14 being connected in series to the first power source 18 and the other two U-shaped lamps 15 being connected in series to the second power source 19. By alternately connecting the lamps, it is achieved that, if one of the lamps fails, the light of each sub-reflector is reduced by fifty percent. As the lamps 14, 15 are distributed over the sub-reflectors 13 in the above-described manner, the quantity of light produced is halved in the (sub-)reflectors comprising two arm portions, so that the uniformity of the light output of the backlight luminaire is substantially preserved.

Figure 3A:
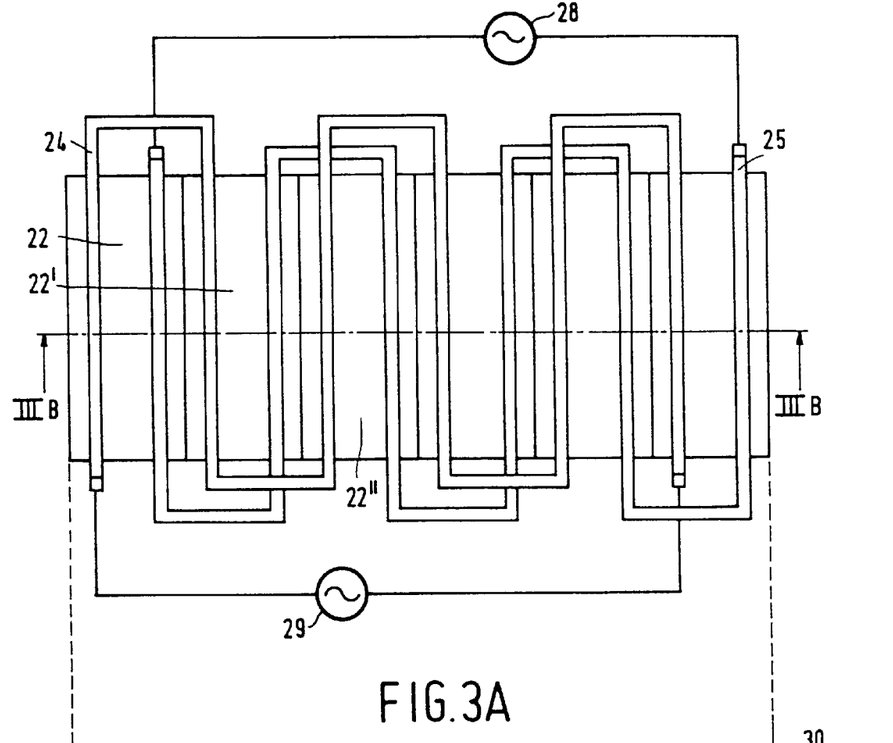
FIG. 3A is a plan view of an embodiment of the backlight luminaire in accordance with the invention, which is provided with meander-shaped fluorescent lamps.
Figure 3B:
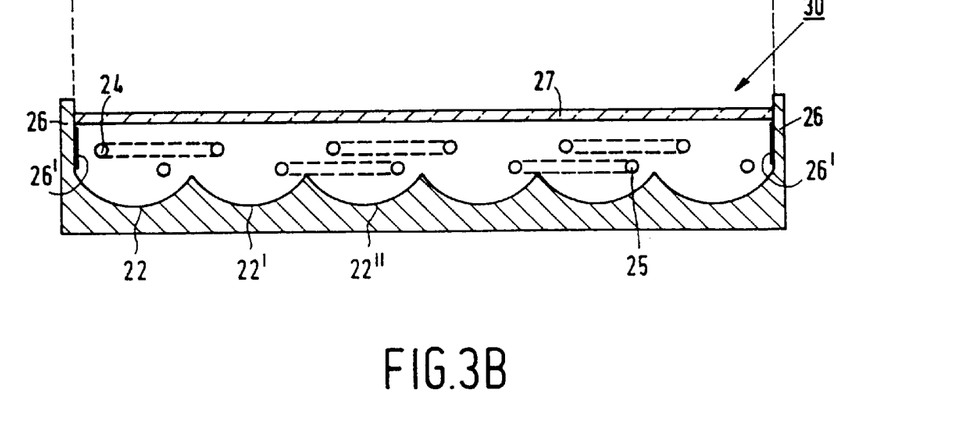
FIG. 3B is a cross-sectional view of the backlight luminaire, taken on the line IIIB—IIIB in FIG. 3A.

FIG. 3A is a schematic, plan view of an embodiment of the backlight luminaire in accordance with the invention, which is provided with two so-called meander-shaped (serpentine) fluorescent lamps 24, 25, and FIG. 3B is a schematic, cross-sectional view of the backlight luminaire 30 shown in FIG. 3A, which luminaire is further provided with a light-scattering cover 27 which is supported by walls 26. A meander-shaped fluorescent lamp 24, generally comprises a hermetically sealed, tubular lamp envelope having (multiple) M-shaped bends, as schematically shown in FIG. 3A. The meander-shaped lamp is composed of several (at least substantially parallel) arm portions which are interconnected via connecting portions. In the example shown in FIG. 3, the backlight luminaire 30 comprises a group of sub-reflectors 22, 22', 22", etc. which are arranged in a side-by-side relation. The successive arm portions of the meander-shaped fluorescent lamps 24, 25 are accommodated in successive sub-reflectors 22. In addition, each sub-reflector 22 accommodates an arm portion of each meander-shaped fluorescent lamp 24, 25. By virtue of this distribution of the arm portions of the lamps 24, 25 over the sub-reflectors 22, differences in color point (spectral characteristic) and light intensity between the two meander-shaped lamps are not limited to one sub-reflector but, instead, distributed (spread out) in each sub-reflector accommodating a portion of each of the meander-shaped lamps. This results in a substantial improvement of the uniformity of the backlight luminaire 30. The light output and the homogeneity of the light distribution are further improved if the (vertical) portions of the walls 26 are provided with a reflective layer 26' having a high reflection coefficient.

In the example shown in FIG. 3, the lamps 24, 25 are individually connected to respective voltage sources 28, 29. If one of the power sources is switched off, the integral light output of the backlight luminaire is reduced by fifty percent without seriously affecting the uniformity of the light distribution.

Figure 4A:
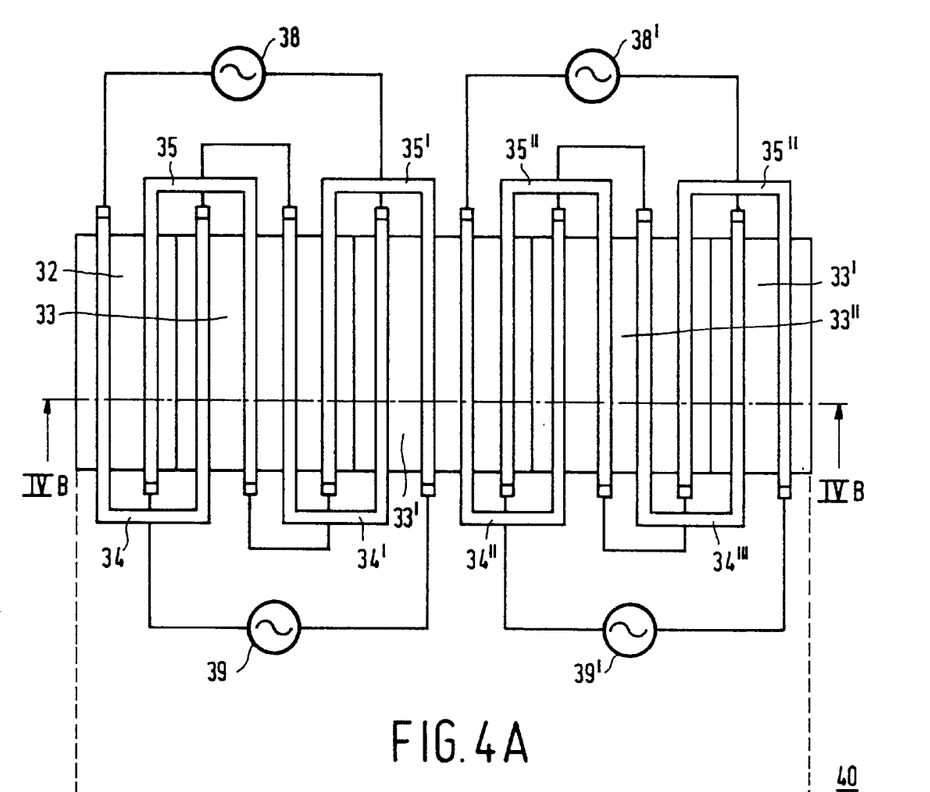
FIG. 4A is a plan view of an embodiment of the backlight luminaire in accordance with the invention, which comprises two or more arm portions of fluorescent lamps per sub-reflector.
Figure 4B:
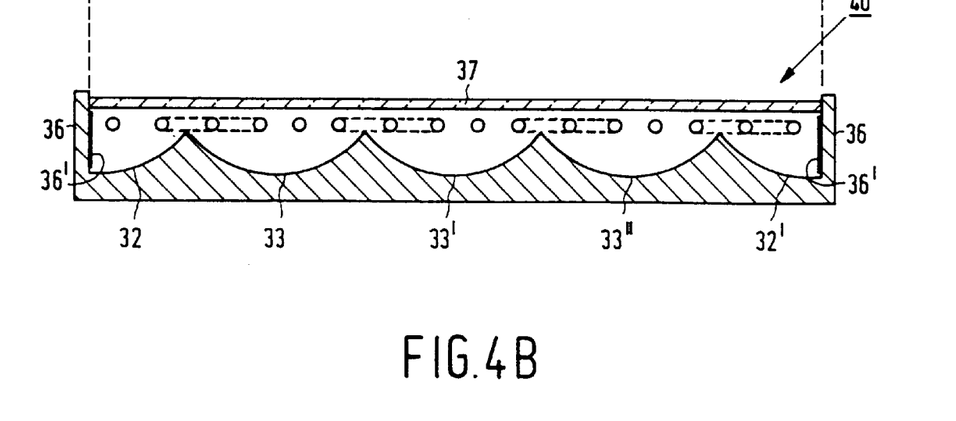
FIG. 4B is a cross-sectional view of the backlight luminaire, taken on the line IVB—IVB in FIG. 4A.

FIG. 4A is a schematic, plan view of an embodiment of the backlight luminaire in accordance with the invention, which comprises two or more arm portions of fluorescent lamps per sub-reflector, and FIG. 4B is a cross-sectional view of the backlight luminaire 40 corresponding to the one shown in FIG. 4A, which luminaire further comprises a light-scattering cover 37 which is supported by walls 36. In the example shown in FIG. 4, the majority of the sub-reflectors 33, 33', 33" always comprise four arm portions of four different U-shaped lamps 34, 34', 34", 34"'; 35, 35', 35", 35"'. In this example, the two edges of the backlight luminaire 40 are provided with two "half" sub-reflectors 32, 32' which each accommodate only two arm portions of two fluorescent lamps. The light output and the uniformity of the light distribution are further improved if the (vertical) walls of the "half" sub-reflectors 32, 32' are provided with a reflective layer 36' having a high reflection coefficient.

By virtue of the above-described distribution of the lamps 34, 35 over the sub-reflectors 32, 33, differences in color point (spectral characteristic) and light intensity between two lamps are not limited to one sub-reflector but, instead, distributed (spread out) over the majority of the sub-reflectors 33, 33', 33". As, in addition, the majority of the sub-reflectors comprises four arm portions of four different U-shaped fluorescent lamps, the uniformity of the backlight luminaire is improved considerably.

A further improvement of the uniformity of the light distribution is achieved in the embodiment shown in FIG. 4 by alternating connecting the lamps 34, 35 are alternately connected in series in such a manner that adjacent arm portions of lamps 34, 35 in one sub-reflector 33 are not connected to the same power source. In the example shown in FIG. 4A, four power sources 38, 38', 39, 39' are used, with two U-shaped lamps 34, 34' being connected in series to a first power source 38, two U-shaped lamps 35, 35' being connected in series to a second power source 39, two U-shaped lamps 34', 34", being connected in series to a third power source 38' and two U-shaped lamps 35', 35"' being connected in series to a fourth power source 39'.

Figure 5:
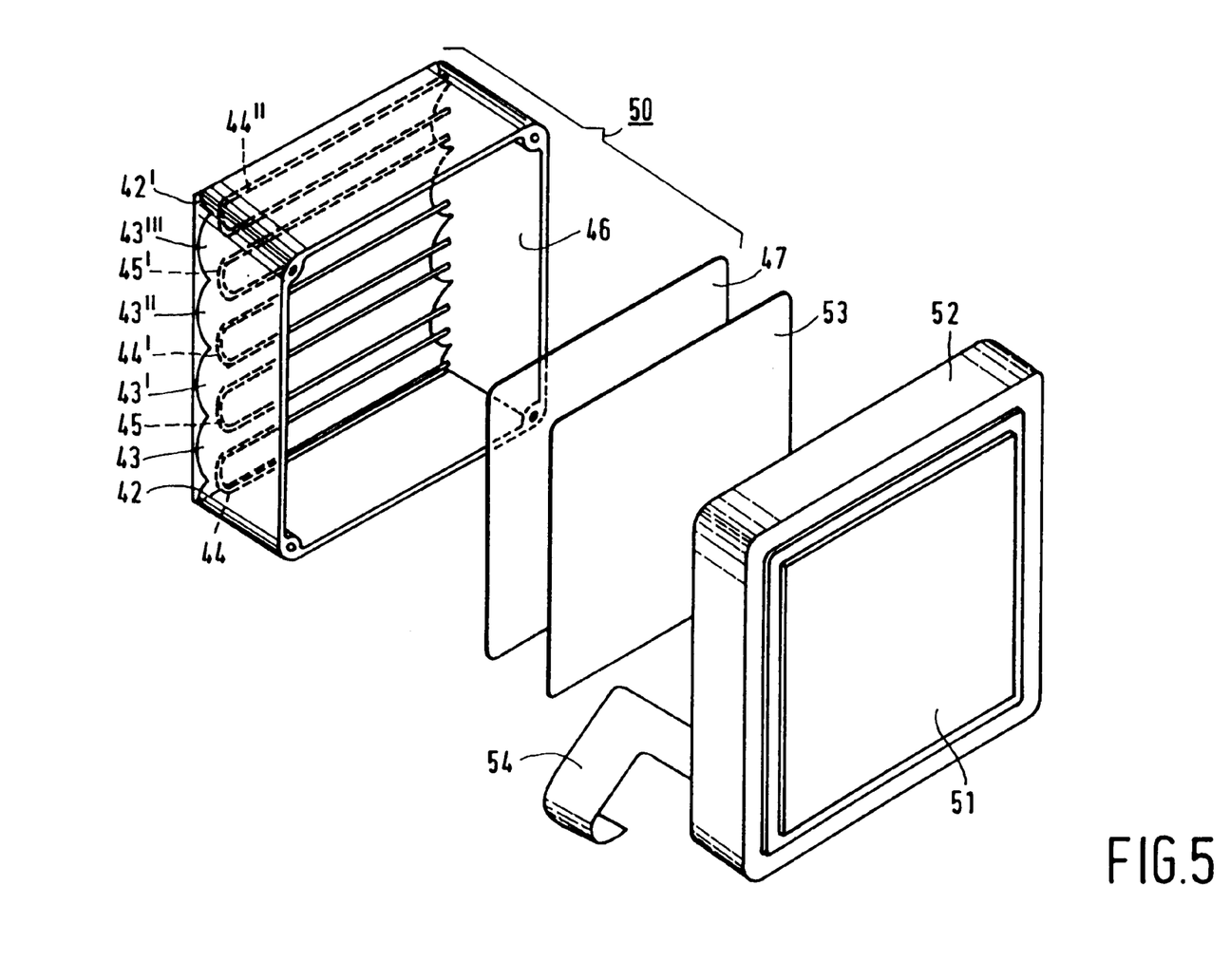
FIG. 5 is an exploded view of an assembly of a liquid-crystal display device and a backlight luminaire.

FIG. 5 is a very schematic, exploded view of an assembly of a liquid-crystal display device 51 and a backlight luminaire 50. In the example shown in FIG. 5, the liquid-crystal display device 51 is accommodated in a housing 52 which is provided with mounting means (not shown in FIG. 5) and, if necessary, a support 54. In addition, a filter 53 may be situated between the liquid-crystal display device 51 and the backlight luminaire 50. The backlight luminaire 50 is provided with a light-scattering cover 47 (diffusor) which, in the assembled form, is supported by walls 46. In the example shown in FIG. 5, the majority of the sub-reflectors 43, 43', 43", 43"' always comprise two arm portions of two different U-shaped fluorescent lamps 44, 44', 44"; 45, 45'. The upper side and the lower side of the backlight luminaire 50 are provided, in this example, with two "half" sub-reflectors 42, 42' which each accommodate only one arm portion of a fluorescent lamp 44, 44". The way in which the U-shaped fluorescent lamps 44, 45 are connected to power sources is not shown in FIG. 5. In order to maximize the light output of the backlight luminaire 50 shown in the example of FIG. 5, the connecting portions of the U-shaped fluorescent lamps 44, 45 are situated in a transition portion between two sub-reflectors and hence are an integral part of the backlight luminaire.

By virtue of the above-described distribution of the lamps 44, 45 over the sub-reflectors 43, differences in color point (spectral characteristic) and light intensity between two lamps are distributed (spread out) in each sub-reflector which accommodates an (equivalent) portion of at least two lamps. This results in a substantial improvement of the uniformity of the backlight luminaire.

It will be obvious that within the scope of the invention many variations are possible to those skilled in the art.

In general, the invention relates to a backlight luminaire comprising a plurality of fluorescent lamps and a plurality of sub-reflectors. The backlight luminaire is characterized in that the majority of the sub-reflectors are provided with a portion of more than one lamp. In addition, the majority of the lamps are distributed over more than one sub-reflector. The lamps are preferably U-shaped and alternately connected in series. The backlight luminaire is used in liquid-crystal display devices to attain a uniform light distribution.

I claim:

1. A backlight luminaire (10, 20, 30, 40, 50) for a display device, which luminaire comprises a plurality of fluorescent lamps (4, 5) with a longitudinal direction and a reflector which includes a plurality of concave sub-reflectors (2, 3), wherein portions of at least two lamps (4, 5) are arranged over each of a plurality of sub-reflectors, and a plurality of the lamps (4, 5) are situated over at least two sub-reflectors (2, 3).

2. A backlight luminaire as claimed in claim 1, characterized in that the lamps (14, 15) comprise at least a first arm portion (14', 15') and a second arm portion (14", 15"), which arm portions are arranged in side-by-side relation to each other and are interconnected via a connecting portion, said first arm portion (14', 15') being accommodated in a first sub-reflector (13') and said second arm portion (14", 15") being accommodated in a second sub-reflector (13, 13").

3. A backlight luminaire as claimed in claim 1, characterized in that the above-mentioned portions (14', 15', 14", 15") exhibit, in the longitudinal direction, a variation of the spectral characteristic, and in that the spectral characteristic of the portion (14'; 14") of a first lamp (14) in a sub-reflector (13'; 13, 13") varies in the opposite direction relative to the variation in spectral characteristic of the portion (15'; 15") of a second lamp (15) in said sub-reflector (13'; 13, 13").

4. A backlight luminaire as claimed in claim 3, characterized in that all portions of the lamps (4, 5; 4', 5'; 4", 5"; 4',' 5") are so arranged that the spectral characteristics of two portions extending side by side in one sub-reflector (2, 3; 2', 3'; 2", 3"; 2"', 3"') vary in opposite directions.

5. A backlight luminaire as claimed in claim 1, characterized in that at least two of the lamps (4, 4'; 5, 5'; 4', 4"; 5", 5") are connected in series.

6. A backlight luminaire as claimed in claim 5, characterized in that the lamps (14, 15) are alternately connected in series.

7. A backlight luminaire as claimed in claim 6, characterized in that all lamps (14, 15) are alternately connected in series.

8. A backlight luminaire as claimed in claim 5, characterized in that the lamps (34, 34'; 35', 35'; 34", 34"'; 35", 35") are groupwise connected in series.

9. A backlight luminaire as claimed in claim 1, characterized in that the lamps (24, 25) are connected to at least two groups of power sources (28, 29), with each of the sub-reflectors (22, 22', 22") accommodating a portion of a lamp of each of the groups.

10. A backlight luminaire as claimed in claim 9, further comprising a switch by means of which one of the groups can be switched off.

11. A backlight luminaire as claimed in claim 1, characterized in that at least a number of the sub-reflectors (33, 33', 33") are provided with a portion of four lamps (34, 35, 34', 35', 34', 35", 34", 35").

12. A backlight luminaire as claimed in claim 1, characterized in that the plurality of sub-reflectors are arranged one beside the other and, apart from the first and the last sub-reflector, the sub-reflectors are provided with a portion of at least two lamps.

13. A backlight luminaire as claimed in claim 12, characterized in that walls (16) of the first and last sub-reflector (12, 12') are provided with a reflective layer (16').

14. A backlight luminaire as claimed in claim 1, characterized in that the sub-reflectors comprise directed reflectors.

15. A liquid-crystal display device (51) comprising a backlight luminaire as claimed in claim 1.

16. A backlight luminaire for a display device, said luminaire comprising a reflector comprising a plurality of side-by-side concave sub-reflectors, and a plurality of U-shaped fluorescent lamps arranged over said reflector, each lamp comprising a first arm portion over one of said sub-reflectors, a second arm portion over another of said sub-reflectors, and a connecting portion interconnecting said arms, arm portions of at least two lamps being arranged over a plurality of sub-reflectors.

17. A backlight luminaire as in claim 16 wherein said U-shaped lamps are arranged side-by-side.

18. A backlight luminaire as in claim 16 wherein said U-shaped lamps are arranged so that at least one said arm portion of each said lamp lies between first and second arm portions of another said lamp.

* * * * *